June 25, 1935. A. H. DOWNS 2,005,776
DEVICE FOR SPRAYING PAINTS, LACQUERS AND OTHER LIQUIDS
Filed Oct. 30, 1930 2 Sheets-Sheet 1
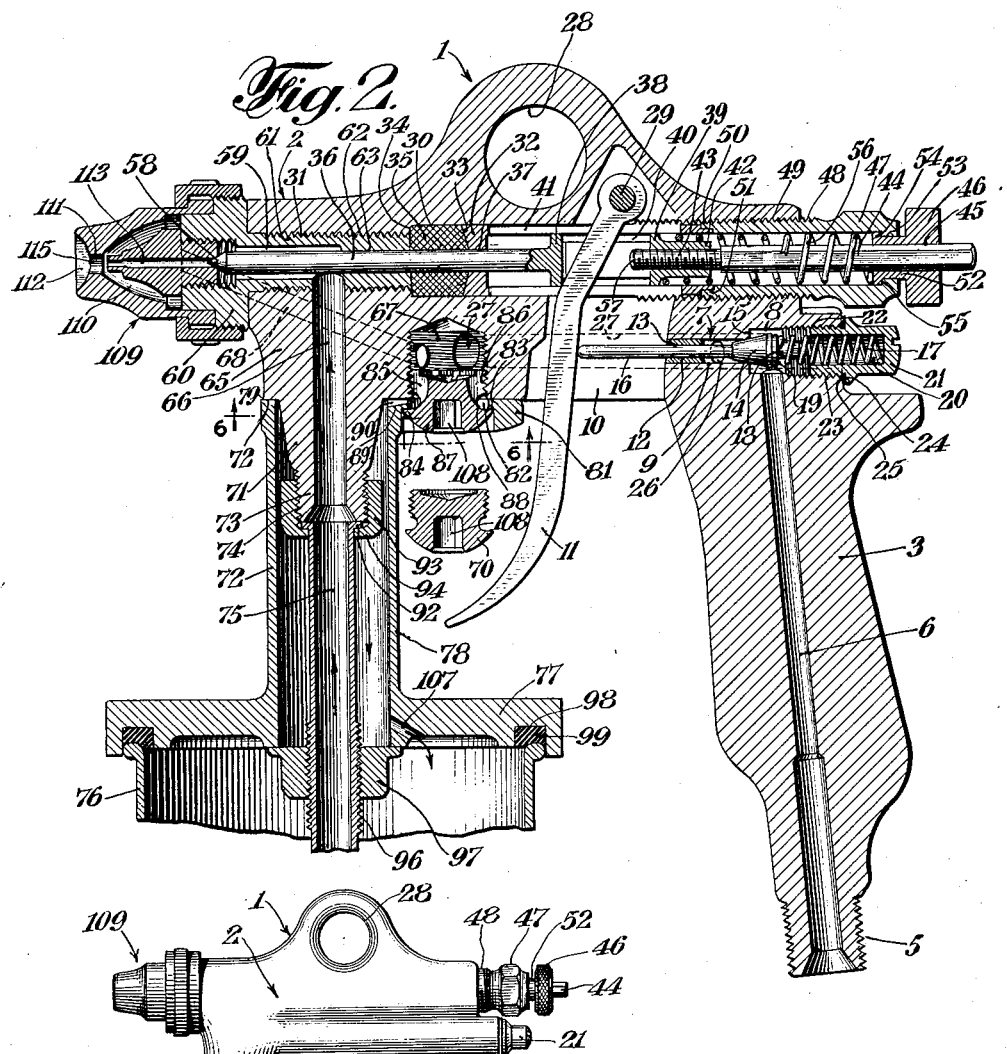
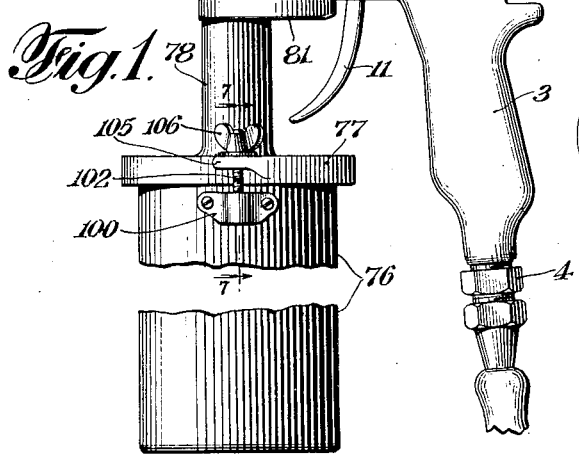
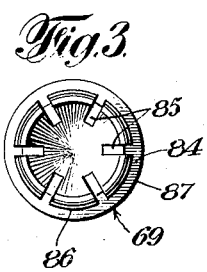
INVENTOR
Austin H. Downs
BY Pringle, Bean & Mann
ATTORNEYS

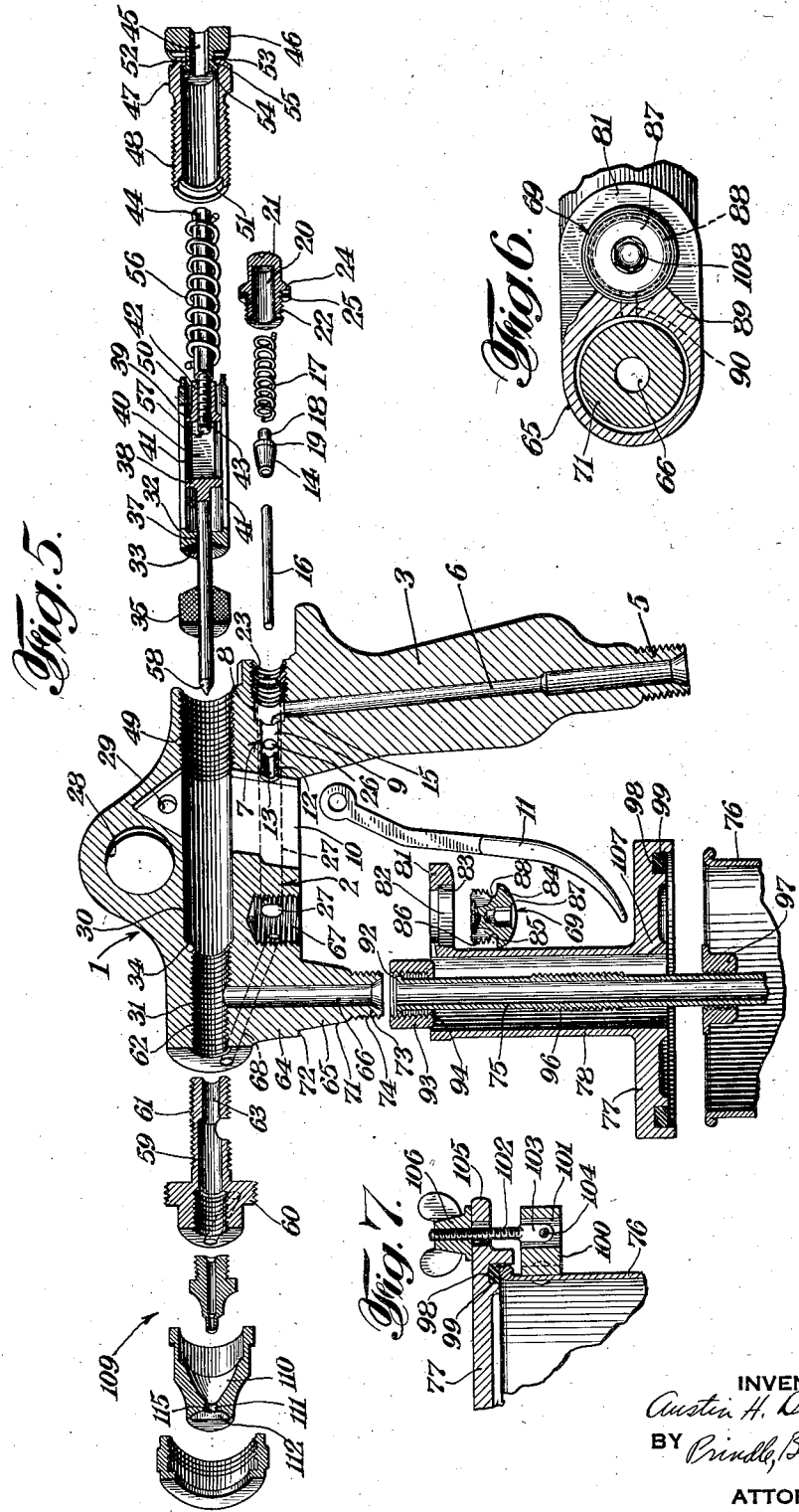

Patented June 25, 1935

2,005,776

UNITED STATES PATENT OFFICE 2,005,776

DEVICE FOR SPRAYING PAINTS, LACQUERS, AND OTHER LIQUIDS

Austin H. Downs, Newark, N. J., assignor to Eclipse Air Brush Company, Inc., Newark, N. J., a corporation of New Jersey Application October 30, 1930, Serial No. 492,126

12 Claims. (Cl. 299—89)

This invention relates to improvements in devices for spraying paints, lacquers or other liquids, as well as heavy liquids, semi-pastes, etc., and while it is designed principally for coating for decoration and protection, has uses in other arts as well.

The principal object of this invention is the provision of a device which may be used either with a pressure liquid cup or container, or with a tank of liquid material under pressure.

Another object of the invention is the provision of such a device which is simple and compact in construction and which may be readily assembled and disassembled and which is highly efficient in operation and simply and readily controlled to use a minimum amount of material and a minimum amount of pressure to accomplish the best results.

Further objects include improvements in details of construction which are hereinafter set forth in full.

To the accomplishment of the foregoing and such other objects as may hereinafter appear, this invention consists in the construction, combination and arrangement of parts hereinafter described and then sought to be defined in the appended claims, reference being had to the accompanying drawings forming a part hereof and which show, merely for the purpose of illustrative disclosure, a preferred embodiment of my invention, it being expressly understood, however, that various changes may be made in practice within the scope of the claims without digressing from my inventive idea.

In the drawings—

Figure 1 represents a side elevation of a device constructed to embody my invention with a pressure liquid cup or container attached thereto.

Figure 2 represents an enlarged vertical longitudinal section taken through the device shown in Figure 1, and also includes a nut member which is used to replace the one shown in position in Figure 2 when the pressure cup or container is to be dispensed with.

Figure 3 represents a bottom plan view of the nut member shown in position in Figure 2.

Figure 4 represents a bottom plan view of the nut member which replaces the nut member shown in position in Figure 2 when the pressure cup is dispensed with.

Figure 5 represents an exploded view of the various parts comprising the device shown in Figure 2, most of the parts being shown in section.

Figure 6 represents a horizontal cross sectional view taken on line 6—6 of Figure 2.

Figure 7 represents a vertical sectional view taken on line 7—7 of Figure 1.

Referring now to the drawings, the numeral 1 designates the body of the device as a whole, this body including the barrel portion 2 and the handle portion 3, the handle portion extending downwardly from the barrel portion and inclined slightly to the rear so that the device has somewhat the appearance of an automatic revolver, the handle portion providing a suitable and comfortable grip for the operator.

Devices of this kind are employed to spray material principally for coating purposes, the material usually being fluid and atomized by air under pressure. This material is fed to the point of atomization by pressure and consequently the device is provided with ports, passages and valves together with operating media for controlling the admission and passage of the pressure fluid as well as the fluid material, and the atomization of the same. A connection 4 to a suitable source of air or other fluid pressure is made with the threaded nipple 5 on the lower end of the handle portion 3. Usually this fluid pressure is automatically maintained at a set or predetermined figure by suitable regulating means, as is well understood and practiced in the art. This nipple 5 leads to the port of passage 6 which extends upwardly through the interior of the handle 3 to the air inlet valve chamber 7. This valve chamber is formed by boring or drilling passages 8 and 9 horizontally through the lower rear portion of the barrel part from the rear end and to and into the space 10 in an intermediate portion thereof. This space 10 is adapted to receive a trigger 11 and permit its operative movement therein. It is to be noted that passage 8 is of a larger diameter than passage 9 and that a shoulder or seat 15 is formed which will again be referred to later. In the forward end of passage 9 is mounted a bushing 12, which bushing is provided with a longitudinal bore or passage 13. A valve 14 is adapted to be seated against the seat or shoulder 15 formed between passages 8 and 9 above referred to and is provided with the plunger or rod 16 slidably mounted in said bore or passage 13 and extending out into the space 10 to be engaged by the trigger 11, as will more fully hereinafter appear. The valve 14 is normally maintained on its seat by means of the pressure of spring 17 which is positioned about the stud 18 on the end of the valve bearing against the valve shoulder 19 at one end and resting within a socket 20 formed in the inner end of the holding and securing member 21.

This member 21 is exteriorly screw-threaded for a portion of its length as at 22 to engage the internal screw-threads 23 formed in the air passage 8 and has the abutment 24 formed to engage the rear end of the barrel portion when screwed home. A washer or gasket 25 is provided for abutment 24. This member 21 permits the ready assembly and disassembly of the air valve structure. It is to be noted that the port 6 opens into the air chamber 8 at the rear side of the valve and that the air passage 9 is provided with a lateral opening 26 leading to the air port or passage 27 formed in the barrel portion 2 and leading forward. It is also to be noted that the valve plunger or rod 16 has an extended bearing in the bushing 12. The spring 17 normally holds the valve 14 on its seat but when the trigger 11 is moved rearwardly it engages the end of the plunger 16 and moves the valve 14 off its seat, permitting the passage of air from the air inlet into the forward leading air port or passage 27.

The barrel portion 2 extends forwardly and in a horizontal direction from the handle portion 3 and is provided with an apertured lug or flange 28 to provide a convenient hanging arrangement. The trigger 11 is pivoted within the barrel portion as at 29 for a longitudinal swinging movement and the space 10 is in the form of a slot extending from a point near the upper edge of the barrel portion, down through the barrel portion until it opens through the lower edge of the barrel portion.

The barrel is bored centrally and longitudinally to provide the packing gland and spring chamber, 30, which extends for a considerable distance from the rear end thereof, and also to provide a forward compartment 31 which extends into the barrel from the front end to its junction with the chamber 30. A packing gland or sleeve 32 is mounted within said chamber or compartment 30 and has one end concaved or bevelled as at 33, which, when assembled in position, is spaced from the shoulder 34, which is formed at the junction between the two chambers or compartments 30 and 31, as the former is of greater diameter. This space is filled with a suitable packing material which surrounds the liquid valve rod or stem 36, which passes through an opening 37 in the end of the packing gland or sleeve 32, thus affording a bearing for said valve rod. Near its rear end this valve rod is provided with a pair of spaced shoulders or abutments 38 and 39 which are circular or annular in shape and are adapted to slidably engage the interior surface of the packing gland or sleeve 32, and between these spaced shoulders or abutments I provide an elongated slot or recess 40 adapted to permit the passage of the trigger 11 therethrough. The packing gland or sleeve is provided on each side with elongated slots or openings 41 with which said elongated slot or recess 40 in the valve stem 36 is in alinement, and which likewise permit the passage of the trigger therethrough. The extreme rear end of the rod 36 is interiorly bored and screw-threaded as at 42, this bore leading entirely through the rear end portion and into the elongated slot or recess 40. This threaded opening 42 receives the screw-threaded end 43 of the adjusting rod 44 which extends rearward and is shown as being hexagonal in shape, passing through a corresponding bore 45 in a knurled adjusting nut or member 46. Of course, it is to be understood that while I show the adjusting rod 44 as hexagonal in cross section and the bore 45 of the member 46 as of similar cross section, these are merely preferred forms and a slidable connection between these two parts may be afforded in various other ways. The sleeve member 47 is exteriorly screw-threaded as at 48 to engage the interior threads 49 formed in the rear end portion of the chamber or compartment 30. This sleeve member 47 extends into engagement with the rear end of the packing gland and sleeve member 32 which is reduced as at 50 to fit a complementary reduced portion 51 formed interiorly in the forward end of the sleeve 47. The sleeve 47 having screw-threaded engagement with the barrel and bearing against the rear end of the packing gland or sleeve 32, provides the means for varying the pressure on the packing material which is positioned in front of the packing gland or sleeve 32 so as to prevent leakage of the fluid material through the various parts. The nut member 46 has a stud or projection 52 extending through the opening 53 in the end of sleeve 47 and is provided with the shoulder 54 engaging complementary shoulder 55 on the inside of the sleeve 47. The member 46 is freely rotatable in the end of sleeve 47. A spring member 56 is positioned about the adjusting rod 44 and the extreme rear end portion of the valve rod 36 and engages the end of the nut member 46 on the one hand and the rear shoulder or abutment 39 of the liquid valve rod on the other hand. This spring, therefore, affords pressure for maintaining the valve on the end of the liquid valve rod 36 on its seat, as will be presently described. Furthermore, rotation of the nut member 46 and the adjusting plunger 44 will vary the distance between the end of the nut member 46 and the rear shoulder or abutment 39 and thus vary the tension of the spring 56. The forward end 57 of the adjusting plunger 44 extends through the rear end portion of the liquid valve rod into the elongated slot or recess 40, so as to be engaged directly by the trigger 11 when pulled or moved rearwardly. Therefore, the adjustment of the adjusting rod 44 will vary the distance the end 57 thereof projects into the elongated slot or recess 40 and determine the time when the trigger engages the said end and also vary the length of throw of the liquid controlling valve, it being understood that the relative time of opening the air and the liquid control valve and the amount of opening of these valves are material and important factors in the operation of this device.

The forward end of the valve rod 36 is provided with the tapered or bevelled valve head 58 and the forward portion of the valve rod is positioned within a liquid material receiving chamber or compartment 59 which is provided in the front sleeve member 60. This front sleeve member 60 has an elongated portion exteriorly screw-threaded as at 61 corresponding screw-threads 62 formed on the inner surface of the bore or passage 31 formed in the front end portion of the barrel portion 2. The rear end of this sleeve 60 is solid except for a bore or passage 63 through which the liquid valve plunger 36 passes and in which it has a bearing. It is to be noted that this bearing is of considerable extent and with the bearing afforded by the end 33 of the packing gland or sleeve 32 securely holds the valve rod or plunger 36 in proper alinement and affords an extended bearing surface of hard and long-wearing material.

The forward end 64 of the body portion 2 is provided with a downwardly extending portion 65 which has an elongated passage 66 therethrough in line with the liquid material receiving chamber or compartment 59. Positioned to the rear of this passage 66 is an enlarged threaded opening 67 into which the air passage 27 is adapted to open. Extending from this threaded opening 67 is an upwardly directed passage 68 which is adapted to conduct air pressure to the nozzle member of the gun. The threaded opening 67 is adapted to receive either of the nuts 69 or 70 according to whether or not a pressure cup is utilized with the device. The nuts will be more fully described in connection with the pressure cup.

The extension 65 tapers at its lower portion, as at 71, and is provided with the shoulder 72 intermediate its ends. Lower portion 73 of the tapered portion of the extension is externally threaded as at 74 and is adapted to receive a pipe or tube 75 adapted to deliver liquid material to the passage 66 in the extension 65. The extension may be used with a pressure cup or container 76 provided with a top or lid 77 having an elongated sleeve member 78 which is adapted to surround the lower portion of the extension 65 on the body portion 2 of the gun. The top portion 79 of the sleeve member 78 is adapted to abut the shoulder portion 72 of the extension.

The upper end of the elongated sleeve member 78 is provided with an apertured lateral extension 81, the top surface of which is in the same plane as the upper end of the sleeve portion 78 so that the upper end of the sleeve portion and the lateral extension may abut the lower portion of the extension 65 on the bottom thereof. The opening 82 through the lateral extension 81 is formed with bores of different diameters to provide the shoulder 83 which is adapted to receive the flange 84 on the nut 69. The opening 82 is adapted to be brought into alinement with the threaded opening 67 in the extension 65 of the gun. The nut 69 is provided with a plurality of radial slits or slots 85 which extend inwardly from the surface of the annular threaded portion 86. The portion between the head 87 and the threaded portion 86 is cut away or grooved as at 88 to form an air passage or conduit with the slots 85 so that when the nut 69 is threaded into the opening 67, air may be conducted through the slots and through the cut away or grooved portion 88.

The connecting portion 89 between the sleeve member 78 and the lateral extension 81 is provided with a channel or groove 90, and is adapted to form part of a conduit extending from the interior of the sleeve member 78 to the threaded opening 67 by means of the slots 85 and cut away portion 88 in the nut 69, so that air pressure may be communicated to the cup.

The pipe or tubular member 75 has an integral flange 92 at its upper end and is adapted to be held against the lower end of the extension 65 by means of the coupling member 93 which is in threaded engagement with the lower portion 73 of the extension 65. The coupling member 93 is provided with an inturned flange 94 which cooperates with the collar or flange 92 on the pipe 75 to hold the parts tightly together. Intermediate its ends, the pipe is provided with the external threaded portion 96 upon which is threaded the nut 97. When the device is assembled with a cup or container, the nut 97 is threaded on the pipe and abuts the under side of the top or lid 77 of the cup or container 76 and forces the elongated sleeve member 78 against the shoulder 72 on the extension. The top or lid 77 is provided with an annular depression or cut away portion 98 near its edge which is adapted to receive a washer or gasket 99.

The washer or gasket 99 is adapted to rest on the top edge of the cup or container 76 and the lid or top 77 is held against the cup or container 76 by means of the following construction. A plurality of bolts are connected to the outside of the cup or container, as shown in Figure 1, by means of a strap 100 fastened thereto, the strap being provided with a hole 101 to receive a bolt 102 and pivotally retain the bolt head 103 on pintle 104. The top or lid is provided with a wing or extension 105 which is spaced from the lid to form a slot and which is adapted to receive the bolt 102. Threaded onto the bolt 102 is a wing nut 106 which may be turned so as to hermetically seal the lid on the cup or container. The space between the exterior of pipe 75 and the sleeve member 78 of the lid 77 communicates with the interior of the cup or container by means of the opening 107 in the lid or cover.

When the device is to be used without a pressure cup, the nut 70 is screwed into threaded opening 67 and prevents the escape of pressure from the opening 67 and the air under pressure must, therefore, be conducted through conduit 68 to the nozzle member without any bypass. The nut 70 differs from nut 69 in that no radial slots are provided. It is to be noted that each of the nut members 69 and 70 are provided with a central hexagonal depression 108 in their exterior surface which is adapted to receive a wrench so that the nut members may be removed from the threaded opening 67.

The nozzle member 109 is shown and described in detail in my Patent No. 1,706,875 issued March 26, 1929. This is what I term a fan slot nozzle which is of general cylindrical form and substantially hollow, the means of attachment to the end of the barrel portion of the device having previously been described. A conically shaped passage 110 extends through the major portion of the length of the nozzle and leads to a cylindrical passage 111 in the front end thereof. This cylindrical passage leads to a flat fan shaped or arcuate slot 112. The cylindrical tube 113 of the fluid tip is positioned within the cylindrical passage 111 of the nozzle. The junction of the cylindrical passage 111 with the fan-shaped slot 112, it being understood that the diameter of the cylindrical passage is greater than the width of the slot, affords abrupt shoulders 115. These shoulders 115 assist in breaking up the liquid by diverting the direction of flow of the air and causing the air to undergo a sharp change of direction and pass into and across the stream of liquid from the fluid tip.

The operation of the device will now be described. With the pressure cup and the nut 69 in position it will be apparent from the foregoing description that when the trigger 11 is pulled rearwardly the valve 19 is pushed to the rear and air pressure is conducted through the opening 26, through conduit 27, through the threaded opening 67 in the extension 65 of the gun. From this point, the air travels in two directions, namely, one to the nozzle member by means of the conduit 68, and the other to the pressure cup or container 76 by means of the slots 85, the cut away portion 88 on the nut 69, and the cut away portion or groove 90 on the sleeve member 78. From the interior of the sleeve member the fluid under pressure passes through opening 107 in the lid or cover 77 and places the liquid material in the cup or container 76 under pressure and then forces the liquid up through pipe 75, opening 66, and into liquid compartment 59, which opens into the nozzle member, the outlet of liquid being controlled by the liquid valve 36. It is to be noted that when the painting operation is stopped, and pressure released from the trigger, the spring constructions will return the trigger to its normal position and will first shut the liquid valve on its seat to prevent the further supply of liquid to the nozzle and then will shut the air valve on its seat after sufficient air has passed through the device to completely clean the same and prevent dripping.

When it is desired to remove the pressure cup or container, and connect the opening 66 with a pipe connected to a tank of liquid material under pressure, the wing nuts 105 are first loosened and the cup removed, then the nut 97 is loosened and the nut 69 is removed from the threaded opening 67 and the sleeve member 72 may be removed. The nut 70, shown in Figure 2 as positioned beneath nut 69, is then threaded into the threaded opening 67 and fluid under pressure may only travel from the air passage 27 to the threaded opening 67 and then to the nozzle member 109 of the gun by means of the passage 68.

What I claim is:

1. In a device of the character described, including in combination, a body portion having a barrel provided with fluid and liquid conduits, the body portion being provided with a threaded aperture interposed in said fluid conduit, a pressure liquid cup or container adapted to communicate with said liquid conduit, and means for attaching said cup or container to said body portion and whereby fluid under pressure is admitted to said liquid cup or container from said threaded aperture, said means including a slotted screw member received in said threaded aperture, said screw member being positioned exteriorly of said cup or container.

2. In a device of the character described, a body portion having a barrel provided with a fluid conduit, a liquid pressure cup or container, a lid or cover for said cup or container, said lid or cover being provided with a sleeve portion having an apertured lateral extension, said sleeve portion and lateral extension being provided with a channel or groove for conducting fluid pressure from said fluid conduit to said cup or container.

3. In a device of the character described, a body portion having a barrel provided with a fluid conduit, a liquid pressure cup or container, a lid or cover for said cup or container, said lid or cover being provided with a sleeve portion having an apertured lateral extension, said sleeve portion and lateral extension being provided with means for conducting fluid pressure from said fluid conduit to said cup or container.

4. In a device of the character described, a body portion having a barrel provided with fluid and liquid conduits, said body portion being provided with a threaded aperture interposed in said fluid conduit, a pressure liquid cup or container adapted to communicate with said liquid conduit, a lid or cover for said cup or container, said lid or cover being provided with a sleeve portion having an apertured lateral extension, the sleeve portion and the lateral extension being provided with means for conducting fluid under pressure to said cup or container, and a slotted screw member threaded into said threaded aperture and adapted to form part of a conduit for conducting pressure from said threaded aperture to said cup or container.

5. In combination, a paint spraying gun having liquid and fluid pressure conduits with a by-pass outlet communicating with said fluid pressure conduit, a liquid container, a cover for said container, means for detachably connecting said cover and liquid container to the spraying gun, said means including a tube for establishing communication between the interior of the container and said liquid conduit in said spraying gun, said container cover being provided with a sleeve having a laterally extending flange member, and a screw member for connecting said laterally extending flange member to said gun in communication with said by-pass outlet, said screw member and said flange member being constructed so as to provide communication for the passage of fluid pressure from said by-pass outlet to the interior of said container.

6. A device of the character described including in combination, a paint spraying gun having liquid and fluid pressure conduits with a by-pass communicating with said fluid pressure conduit, a liquid container, means for detachably connecting the liquid container to the spraying gun, said means including tubular means for establishing communication between the interior of the container and said liquid conduit in said spraying gun, said container being provided with a sleeve having a laterally extending flange member, and a screw member for connecting said laterally extending flange member to said gun in communication with said by-pass outlet, said screw member being slotted and said flange member being constructed so as to co-operate with said slot in said screw member and to provide communication for the passage of fluid pressure from said by-pass outlet to the interior of said container, said screw member being accessible when the device is in assembled condition.

7. In combination, a paint spraying gun having liquid and fluid pressure conduits with a by-pass outlet communicating with said fluid pressure conduit, a liquid container, means for detachably connecting the liquid container to the spraying gun and establishing communication between the interior of the container and said liquid conduit, said container being provided with a laterally extending flange member and a screw member for connecting said laterally extending flange member to said gun in communication with said by-pass outlet, said screw member being provided with a plurality of slots and said flange member being provided with a groove, the slots in said screw member and the groove in said flange member co-operating to provide a conduit for the passage of fluid pressure from said by-pass outlet to the interior of said container.

8. In a device of the character described, including in combination, a body portion having a barrel provided with fluid and liquid conduits, a pressure liquid cup or container adapted to communicate with said liquid conduit, a lid or cover for said liquid cup or container, said lid or cover being provided with a sleeve having a lateral extension adapted to communicate with the fluid conduit of said device, and means for connecting said extension to said body portion whereby fluid under pressure may be conducted from the fluid conduit of the device through said sleeve to said liquid cup or container and exert pressure on the liquid therein.

9. A device of the character described, including in combination, a body portion having a barrel provided with fluid and liquid conduits, a pressure liquid cup or container adapted to communicate with said liquid conduit, a lid or cover for said liquid cup or container, said lid or cover being provided with a sleeve having a lateral extension adapted to communicate with the fluid conduit of said device, and means for connecting said extension and sleeve to said body portion whereby fluid under pressure may be conducted from the fluid conduit of the device to said liquid cup or container and exert pressure on the liquid therein, said means including a multi-slotted screw member accessible when the device is in assembled condition.

10. In a device of the character described, a body portion having a barrel provided with fluid and liquid conduits, said body portion being provided with an aperture interposed in said fluid conduit, a liquid container, tubular means for connecting said container and said liquid conduit, a cover for said container, said cover being provided with a sleeve surrounding said tubular means and having an apertured lateral extension, the sleeve portion and lateral extension being provided with means for conducting fluid under pressure to said container, and an attaching member for connecting said sleeve portion and lateral extension to said body portion and adapted to form part of a conduit for conducting pressure from said aperture through said sleeve portion and to said container.

11. In a device of the character described, including in combination, a body portion having a barrel provided with fluid and liquid conduits, the body portion being provided with an aperture interposed in said fluid conduit, a pressure liquid cup or container adapted to communicate with said liquid conduit, and means associated with said aperture for attaching said cup or container to said body portion, said means also affording communication between said fluid conduit and said cup or container whereby fluid under pressure is admitted to said cup or container, said means including a slotted screw member accessible when the device is in assembled condition.

12. In a device of the character described, a body portion having a barrel provided with fluid and liquid conduits, said body portion being provided with an aperture interposed in said fluid conduit, a liquid container, tubular means for connecting said container and said liquid conduit, a cover for said container, said cover being provided with a sleeve surrounding said tubular means and having an apertured lateral extension, the sleeve portion and lateral extension being provided with means for conducting fluid under pressure to said container, and an attaching member for connecting said sleeve portion and lateral extension to said body portion and adapted to form part of a conduit for conducting pressure from said aperture through said sleeve portion and to said container, said attaching member comprising a screw or bolt member provided with radial slots.

AUSTIN H. DOWNS.